US012297967B1

(12) United States Patent
Li et al.

(10) Patent No.: US 12,297,967 B1
(45) Date of Patent: May 13, 2025

(54) LED LAMP WITH ROTATABLE LAMP HOLDER FOR ADJUSTING COLOR TEMPERATURE

(71) Applicant: Xiamen Longstar Lighting Co., Ltd., Xiamen (CN)

(72) Inventors: Xilong Li, Xiamen (CN); Yinbo Wang, Xiamen (CN); Zhihui Lai, Xiamen (CN); Xinling Huang, Xiamen (CN); Jincheng Liao, Xiamen (CN)

(73) Assignee: Xiamen Longstar Lighting Co., Ltd., Xiamen (CN)

( * ) Notice: Subject to any disclaimer, the term of this patent is extended or adjusted under 35 U.S.C. 154(b) by 0 days.

(21) Appl. No.: 18/767,358

(22) Filed: Jul. 9, 2024

(30) Foreign Application Priority Data

Jun. 4, 2024 (CN) ......................... 202421264476.1

(51) Int. Cl.
*F21K 9/238* (2016.01)
*F21V 23/04* (2006.01)
*F21Y 115/10* (2016.01)

(52) U.S. Cl.
CPC .............. *F21K 9/238* (2016.08); *F21V 23/04* (2013.01); *F21Y 2115/10* (2016.08)

(58) Field of Classification Search
CPC ................................. F21K 9/238; F21V 23/04
See application file for complete search history.

(56) References Cited

U.S. PATENT DOCUMENTS

2014/0133140 A1* 5/2014 Zhang ................... F21V 19/006
362/396
2020/0332962 A1* 10/2020 Chen ..................... F21V 19/001
2022/0042658 A1* 2/2022 Chen ....................... F21K 9/238
2022/0120387 A1* 4/2022 Yan ......................... F21K 9/238
2024/0077190 A1* 3/2024 Wu ..................... F21V 19/0045
2024/0159380 A1* 5/2024 Li ........................... F21V 17/06

FOREIGN PATENT DOCUMENTS

CN 212841321 A 3/2021

* cited by examiner

*Primary Examiner* — Christopher E Dunay
(74) *Attorney, Agent, or Firm* — Cooper Legal Group, LLC

(57) ABSTRACT

An LED lamp with a rotatable lamp holder for adjusting color temperature includes a bulb shell, a lamp holder, a light source assembly, and a driver circuit board. The bulb shell and the lamp holder are combined to form a sealed space for accommodating the light source assembly and the driver circuit board. The driver circuit board comprises a rotatable switch, and the rotatable switch is fixedly connected to a rotatable knob on the lamp holder through a rotating shell, which enables the rotatable knob to drive the rotatable switch to rotate by an external force.

5 Claims, 6 Drawing Sheets

LED LAMP WITH ROTATABLE LAMP HOLDER FOR ADJUSTING COLOR TEMPERATURE

RELATED APPLICATIONS

This application claims priority to Chinese patent application number 202421264476.1, filed on Jun. 4, 2024. Chinese patent application number 202421264476.1 is incorporated herein by reference.

FIELD OF THE DISCLOSURE

The present disclosure relates to a lighting device, and in particular to bulb lights.

BACKGROUND OF THE DISCLOSURE

Light emitting diode (LED) bulb lights are a common type of lighting source. Traditional LED bulbs typically emit light at a single color temperature, which can be quite limited. To address this, many manufacturers have designed adjustable color temperature LED bulbs. These bulbs comprises at least two different types of LED chips on the light source board, each emitting light at different color temperatures. By using a switch, users can adjust which LED chips are turned on or off, thereby adjusting the overall color temperature of the light emitted. For example, Chinese patent application CN202022424590.4 discloses a light fixture that adjusts color temperature using a toggle switch. It includes an outer decorative shell and a bulb shell. Inside the decorative shell, a first photoelectric integrated board and a heat sink are disposed. The heat sink is positioned above the first photoelectric integrated board. A side surface of the decorative shell is mounted with a first toggle switch. On a side surface of the bulb shell, a second toggle switch is disposed. Inside the bulb shell, a second photoelectric integrated board is installed. This patent application allows users to adjust the color temperature of the light by toggling the switches, thereby choosing between different sets of LED chips with varying color temperatures.

However, in the patent document mentioned above, toggle switch handles protrude externally, affecting the overall aesthetics. Additionally, since drilling switch holes in a lamp body is required, the lamp's overall structure can be disrupted and can increase the complexity of mold production.

BRIEF SUMMARY OF THE DISCLOSURE

The technical problem the present disclosure aims to solve is to provide an LED lamp, and color temperature can be adjusted by rotating a rotatable knob, without compromising an original appearance of the bulb light.

In order to solve the above technical problems, the present disclosure provides an LED lamp with a rotatable lamp holder for adjusting color temperature, comprising: a bulb shell, a lamp holder, a light source assembly, and a driver circuit board. The bulb shell and the lamp holder are combined to form a sealed space for accommodating the light source assembly and the driver circuit board.

The driver circuit board comprises a rotatable switch, and the rotatable switch is fixedly connected to a rotatable knob on the lamp holder through a rotating shell, which allows the rotatable knob to drive the rotatable switch to rotate by an external force.

In a preferred embodiment, the rotatable knob is disposed on a lower end of the lamp holder, and the rotatable knob comprises a gripping recess on which the external force acts.

In a preferred embodiment, the rotating shell is metal. The rotatable knob and the rotating shell are fixedly connected by first cutout slots, and the rotating shell and the rotatable switch are fixedly connected by second cutout slots.

In a preferred embodiment, an inner wall of the lamp holder is disposed with an insulating shell, and the insulating shell comprises a position-providing opening corresponding to a lower end of the lamp holder. One end of the rotatable knob passes through the position-providing opening and is interlocked with the position-providing opening in an opposite direction relative to an insertion direction of the rotatable knob.

In a preferred embodiment, the rotatable knob comprises one or more insertion ribs, and a distal end of each of the one or more insertion ribs protrudes radially outward to form a first position-limiting surface. The first position-limiting surface is interlocked with an inner wall of a lower end of the insulating shell in the opposite direction relative to the insertion direction of the rotatable knob.

In a preferred embodiment, an inner wall of an upper end of the insulating shell extends radially inward to form a second position-limiting surface, and an upper surface of the driver circuit board is interlocked with the second position-limiting surface.

Compared with the existing techniques, the technical solution has the following advantages.

The present disclosure provides the LED lamp with the rotatable lamp holder for adjusting the color temperature, and the LED lamp achieves this function by placing the rotatable knob on the lamp holder and connecting the rotatable knob to the rotatable switch via the rotating shell, so that the rotatable knob can be rotated to drive the rotatable switch to rotate, thereby adjusting the color temperature. This adjustment is achieved without altering the appearance of the bulb light, preserving its original aesthetic structure.

DETAILED DESCRIPTION OF THE EMBODIMENTS

Figure 1:
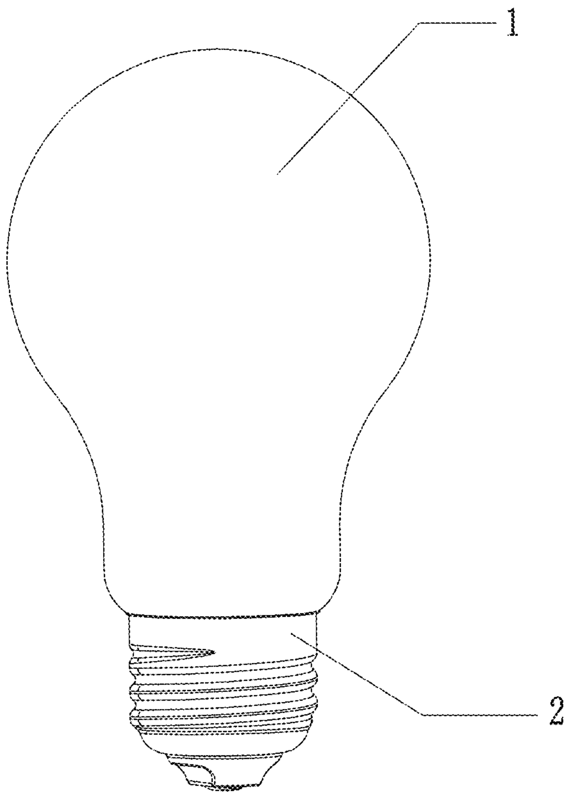
FIG. 1 is a perspective view of an LED lamp in a preferred embodiment of the present disclosure.

The following will clearly and completely describe the technical solutions in the embodiments of the present disclosure with reference to the accompanying drawings. Obviously, the described embodiments are only a portion of the embodiments of the present disclosure, and not all of the embodiments. Based on the embodiments of the present disclosure, all other embodiments obtained by those of ordinary skill in the art without creative work fall within the protection scope of the present disclosure.

In the description of the present disclosure, it should be noted that the terms "upper", "lower", "inner", "outer", "top end", "bottom end", etc. indicate the orientation or positional relationship based on the orientation shown in the drawings. The positional relationship is only for the convenience of describing the present disclosure and simplifying the description, rather than indicating or implying that the referenced device or element must have a specific orientation, be constructed, and be operated in a specific orientation. Therefore, the positional relationship should not be understood as a limitation of the present disclosure. In addition, the terms "first" and "second" are only used for descriptive purposes and should not be understood as indicating or implying relative importance.

In the description of the present disclosure, it should be noted that the terms "installed", "provided with", "sleeved/connected", "connected", etc., should be understood broadly. For example, "connected" can be a wall hanging connection, a detachable connection, or an integral connection, a mechanical connection, an electrical connection, a direct connection, or an indirect connection through an intermediate medium, and it can be a connection in two members. For those of ordinary skill in the art, the specific meaning of the above terms in the present disclosure can be understood under specific conditions.

Figure 2:
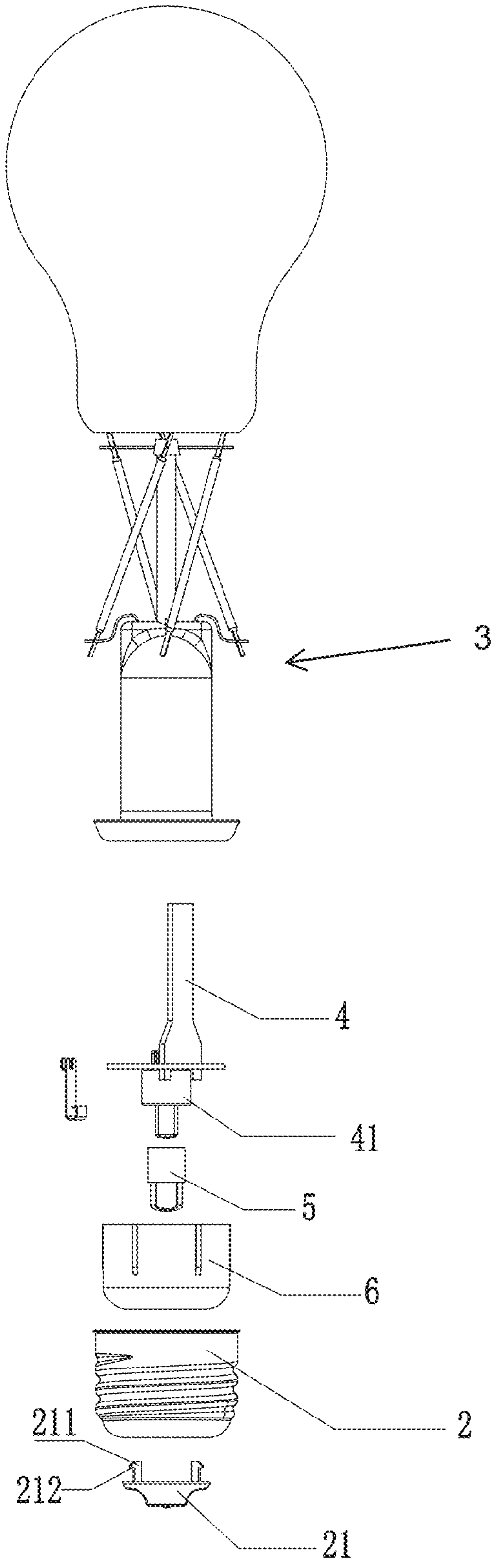
FIG. 2 is an exploded view of the LED lamp in a preferred embodiment of the present disclosure.
Figure 3:
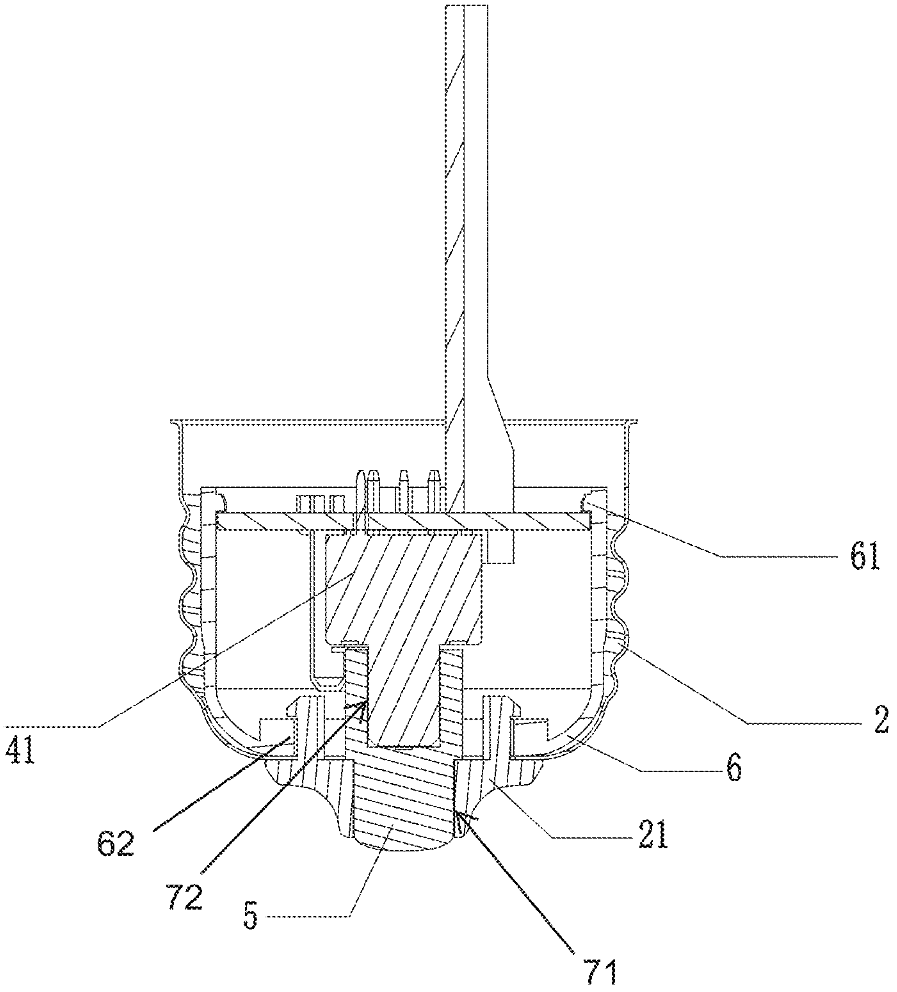
FIG. 3 is a cross-sectional view of a lamp holder of the LED lamp in a preferred embodiment of the present disclosure.
Figure 4:
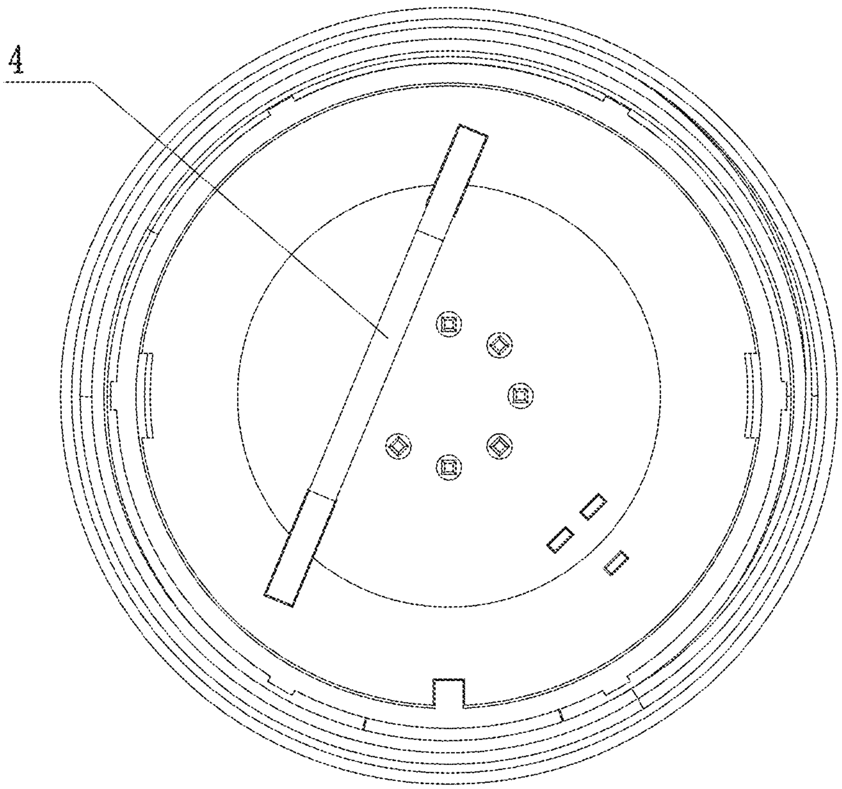
FIG. 4 is a top view of the lamp holder of the LED lamp in a preferred embodiment of the present disclosure.
Figure 5:
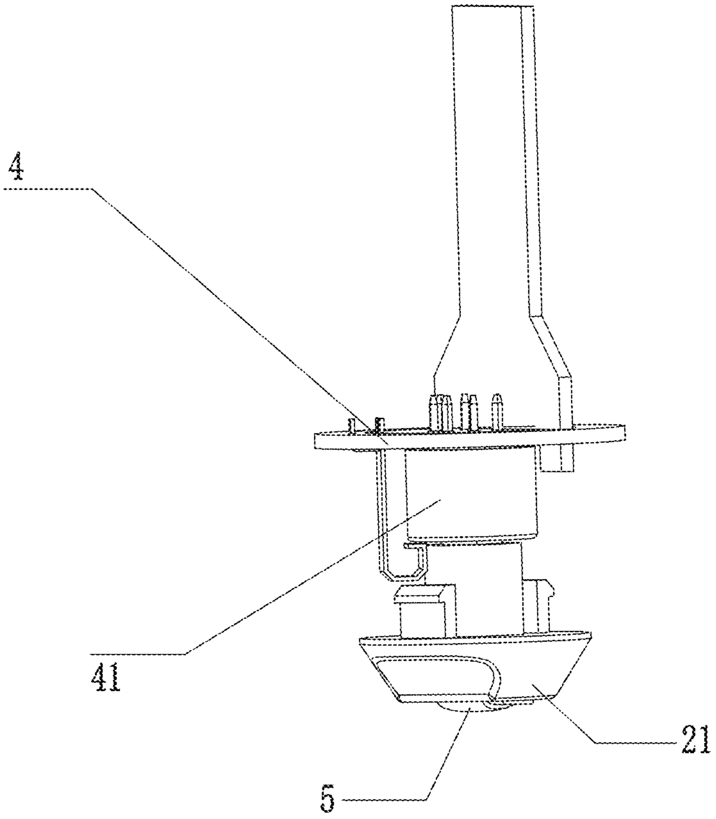
FIG. 5 is a perspective view of a rotatable knob, a rotating shell, and a rotatable switch being assembled in a preferred embodiment of the present disclosure.
Figure 6:
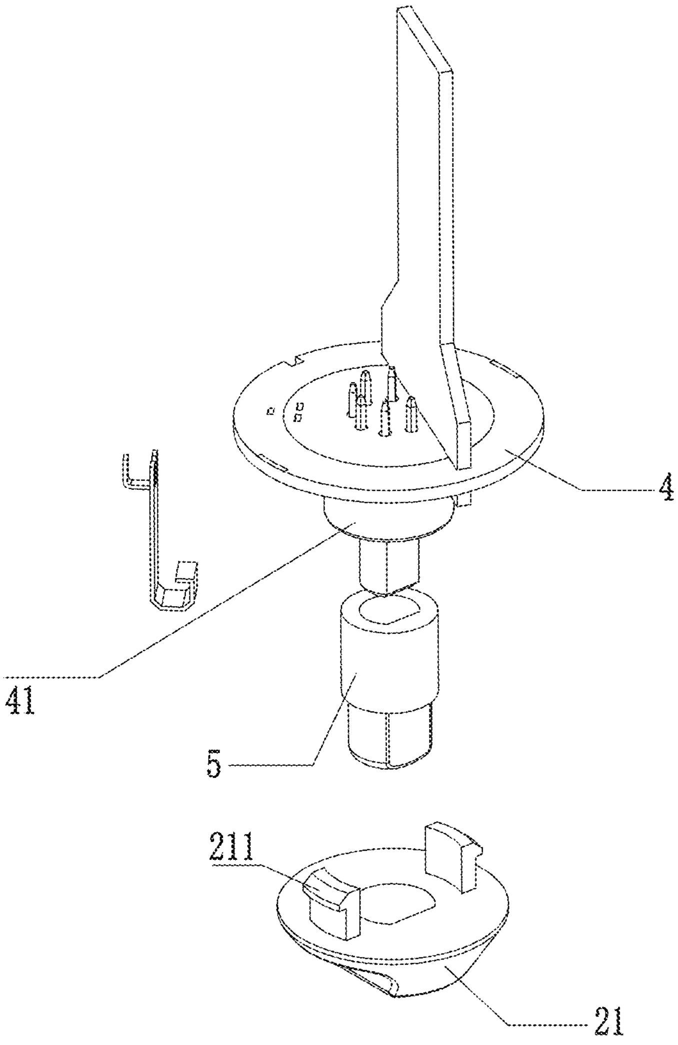
FIG. 6 is an exploded view of the rotatable knob, the rotating shell, and the rotatable switch in a preferred embodiment of the present disclosure.

Referring to FIGS. 1 to 6, the present disclosure provides an LED (Light Emitting Diode) lamp with a rotatable lamp holder for adjusting color temperature, comprising: a bulb shell 1, a lamp holder 2, a light source assembly 3, and a driver circuit board 4. The bulb shell 1 and the lamp holder 2 are combined to form a sealed space for accommodating the light source assembly 3 and the driver circuit board 4.

The driver circuit board 4 comprises a rotatable switch 41, and the rotatable switch 41 is fixedly connected to a rotatable knob 21 on the lamp holder 2 through a rotating shell 5, which allows the rotatable knob 21 to drive the rotatable switch 41 to rotate by an external force.

The LED lamp with the rotatable lamp holder for adjusting the color temperature achieves this function by placing the rotatable knob 21 on the lamp holder 2 and connecting the rotatable knob 21 to the rotatable switch 41 via the rotating shell 5, so that the rotatable knob 21 can be rotated to drive the rotatable switch 41 to rotate, thereby adjusting the color temperature.

In this embodiment, the rotatable knob 21 is disposed on a lower end of the lamp holder 2, and the rotatable knob 21 comprises a gripping recess on which the external force acts. In this way, the users can easily grip the gripping recess on the rotatable knob 21 to rotate the rotatable knob 21.

In this embodiment, to ensure that rotating the rotatable knob 21 can drive the rotatable switch 41 to rotate, the rotatable knob 21 and the rotating shell 5, which is metal, are fixedly connected by first cutout slots 71 and the rotating shell 5 and the rotatable switch 41 are fixedly connected by second cutout slots 72.

Furthermore, an inner wall of the lamp holder 2 is disposed with an insulating shell 6, and the insulating shell 6 comprises a position-providing opening 62 corresponding to the lower end of the lamp holder 2. One end of the rotatable knob 21 passes through the position-providing opening 62 and is interlocked with the position-providing opening 62 in an opposite direction relative to an insertion direction of the rotatable knob 21. This arrangement achieves an installation of the rotatable knob 21.

Specifically, the rotatable knob 21 comprises one or more insertion ribs 211, and a distal end of each of the one or more insertion ribs 211 protrudes radially outward to form a first position-limiting surface 212. The first position-limiting surface 212 is interlocked with an inner wall of a lower end of the insulating shell 6 in the opposite direction relative to the insertion direction of the rotatable knob 21. In this embodiment, the one or more insertion ribs 211 are two insertion ribs 211 spaced 180 degrees apart from each other.

Furthermore, to secure the driver circuit board 4, an inner wall of an upper end of the insulating shell 6 extends radially inward to form a second position-limiting surface 61. An upper surface of the driver circuit board 4 is interlocked with the second position-limiting surface 61.

The aforementioned embodiments are merely some embodiments of the present disclosure, and the scope of the disclosure is not limited thereto. Thus, it is intended that the present disclosure cover any modifications and variations of the presently presented embodiments provided they are made without departing from the appended claims and the specification of the present disclosure.

What is claimed is:

1. A light emitting diode (LED) lamp for adjusting color temperature by rotating a lamp holder, comprising:
- a bulb shell,
- the lamp holder,
- a light source assembly, and
- a driver circuit board, wherein:
  - the bulb shell and the lamp holder are combined to form a sealed space for accommodating the light source assembly and the driver circuit board,
  - the driver circuit board comprises a rotatable switch,
  - the rotatable switch is fixedly connected to a rotatable knob on the lamp holder through a rotating shell, which enables the rotatable knob to drive the rotatable switch to rotate by an external force,
  - an inner wall of the lamp holder is disposed with an insulating shell,
  - the insulating shell comprises a position-providing opening corresponding to a lower end of the lamp holder, and
  - one end of the rotatable knob passes through the position-providing opening and is interlocked with the position-providing opening in an opposite direction relative to an insertion direction of the rotatable knob.

2. The LED lamp for adjusting the color temperature by rotating the lamp holder according to claim 1, wherein:
- the rotatable knob is disposed on the lower end of the lamp holder, and the rotatable knob comprises a gripping recess on which the external force acts.

3. The LED lamp for adjusting the color temperature by rotating the lamp holder according to claim 1, wherein:
- the rotating shell is metal,
- the rotatable knob and the rotating shell are fixedly connected by first cutout slots, and
- the rotating shell and the rotatable switch are fixedly connected by second cutout slots.

4. The LED lamp for adjusting the color temperature by rotating the lamp holder according to claim 1, wherein:
- the rotatable knob comprises one or more insertion ribs,
- a distal end of each of the one or more insertion ribs protrudes radially outward to form a first position-limiting surface, and the first position-limiting surface is interlocked with an inner wall of a lower end of the insulating shell in the opposite direction relative to the insertion direction of the rotatable knob.

5. The LED lamp for adjusting the color temperature by rotating the lamp holder according to claim 1, wherein:

an inner wall of an upper end of the insulating shell extends radially inward to form a second position-limiting surface, and an upper surface of the driver circuit board is interlocked with the second position-limiting surface.

* * * * *